(12) United States Patent
Peterson et al.

(10) Patent No.: US 6,549,934 B1
(45) Date of Patent: Apr. 15, 2003

(54) METHOD AND SYSTEM FOR REMOTE ACCESS TO COMPUTER DEVICES VIA CLIENT MANAGED SERVER BUFFERS EXCLUSIVELY ALLOCATED TO THE CLIENT

(75) Inventors: Glenn R. Peterson, Kenmore, WA (US); Rod Gamache, Issaquah, WA (US); Michael T. Massa, Seattle, WA (US); Norbert P. Kusters, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/260,194

(22) Filed: Mar. 1, 1999

(51) Int. Cl.[7] .............................................. G06F 15/16
(52) U.S. Cl. ........................ 709/203; 709/217; 709/223
(58) Field of Search ................................. 709/203, 217, 709/219, 238–240, 231, 250, 223–224

(56) References Cited

U.S. PATENT DOCUMENTS

| | | | | |
|---|---|---|---|---|
| 5,566,331 A | * | 10/1996 | Irwin, Jr. et al. | 707/10 |
| 5,799,141 A | * | 8/1998 | Galipeau et al. | 710/21 |
| 5,978,815 A | * | 11/1999 | Cabrera et al. | 707/204 |
| 6,014,695 A | * | 1/2000 | Yamashita et al. | 709/219 |
| 6,101,558 A | * | 8/2000 | Utsunomiya et al. | 709/217 |
| 6,131,126 A | * | 10/2000 | Kougiouris et al. | 709/304 |
| 6,134,585 A | * | 10/2000 | Yamato | 709/219 |
| 6,219,693 B1 | * | 4/2001 | Napolitano et al. | 709/203 |
| 6,249,822 B1 | * | 6/2001 | Kays, Jr. et al. | 709/330 |

* cited by examiner

Primary Examiner—Ayaz Sheikh
Assistant Examiner—Philip B. Tran
(74) Attorney, Agent, or Firm—Law Offices of Albert S. Michalik, PLLC

(57) ABSTRACT

A method and system for providing remote access and control of devices such as disks, tape drives and modems across a network. A client driver intercepts I/O requests that are destined for a device which an application essentially considers a local device, such as for purposes of disk mirroring. The client driver queues and dequeues the I/O request, marshals it with header information and data, and sends it as a message to the server over one of possibly multiple connections to the server. A server driver unmarshalls the message, places it in a preallocated buffer as designated by the client, and generates an I/O request therefrom directed to the server device. The server responds with a completion status. The client side manages the server buffers, and the client classifies and partitions large requests into one or more segments that fit the server buffers. Sequential processing also may be ensured. The client also handles cancel operations on the remote device, and the client may also load balance across the multiple paths, by selecting a connection based on criteria including pending message size and dynamic performance measurements of the connections.

72 Claims, 14 Drawing Sheets

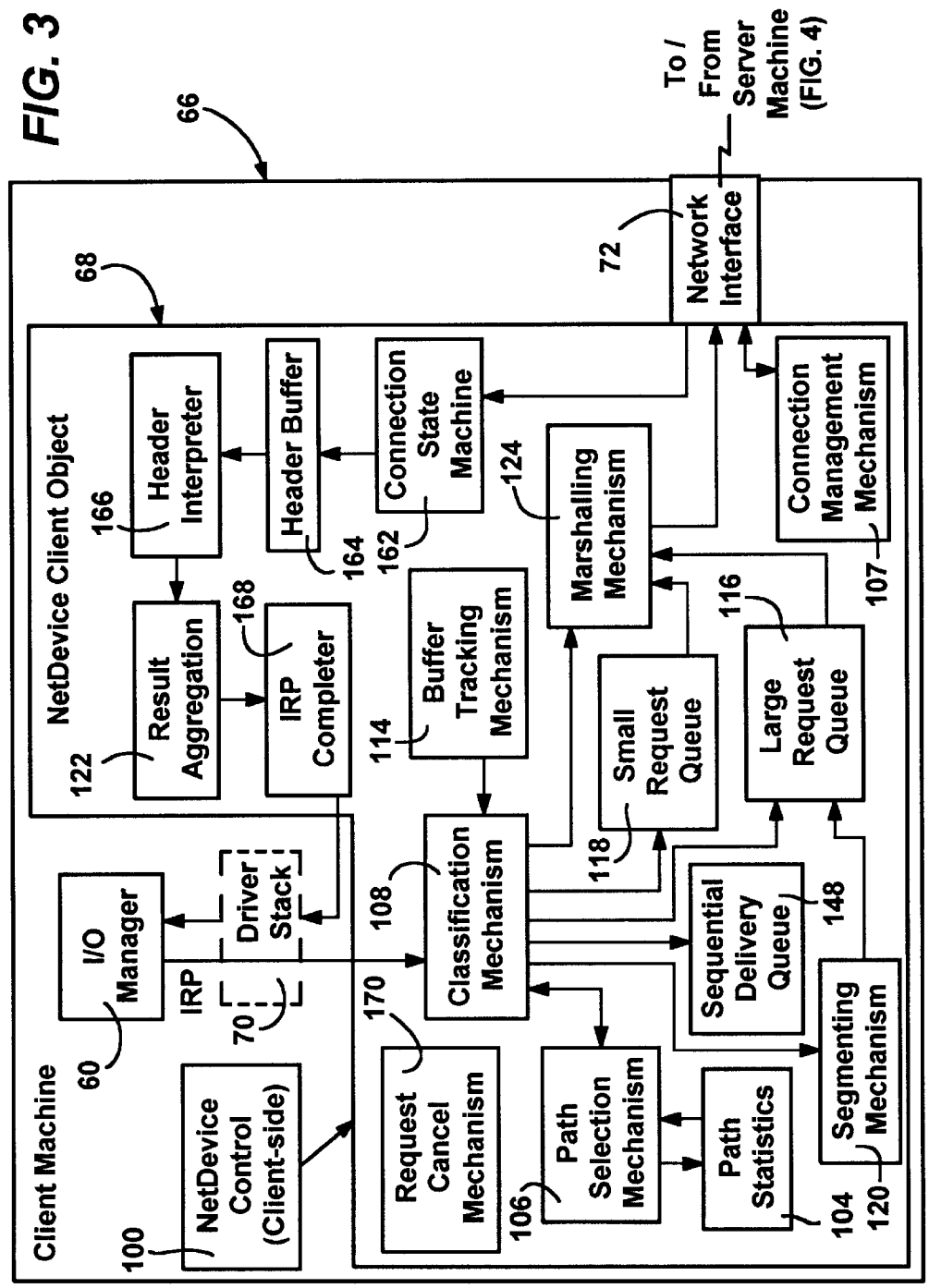

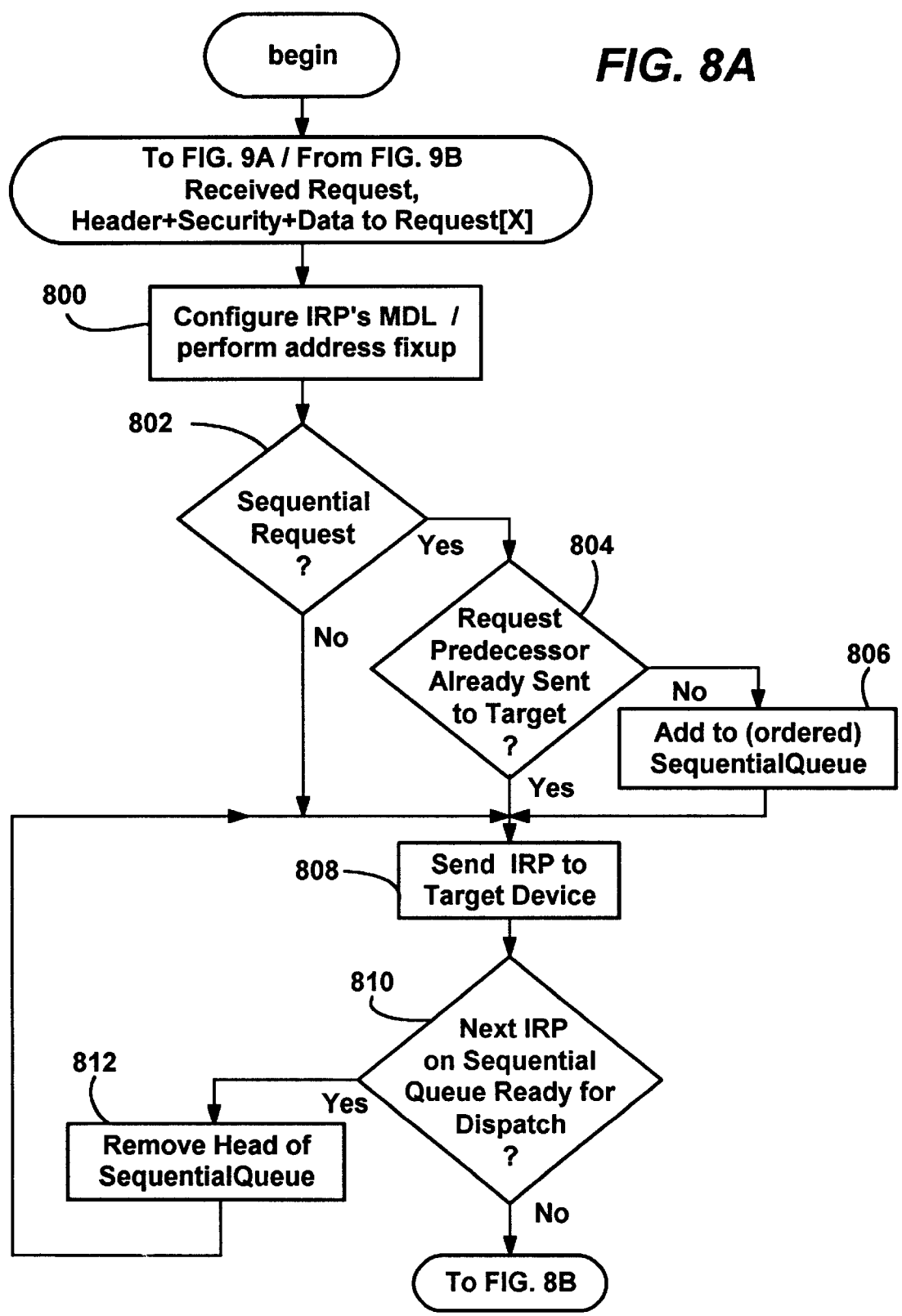

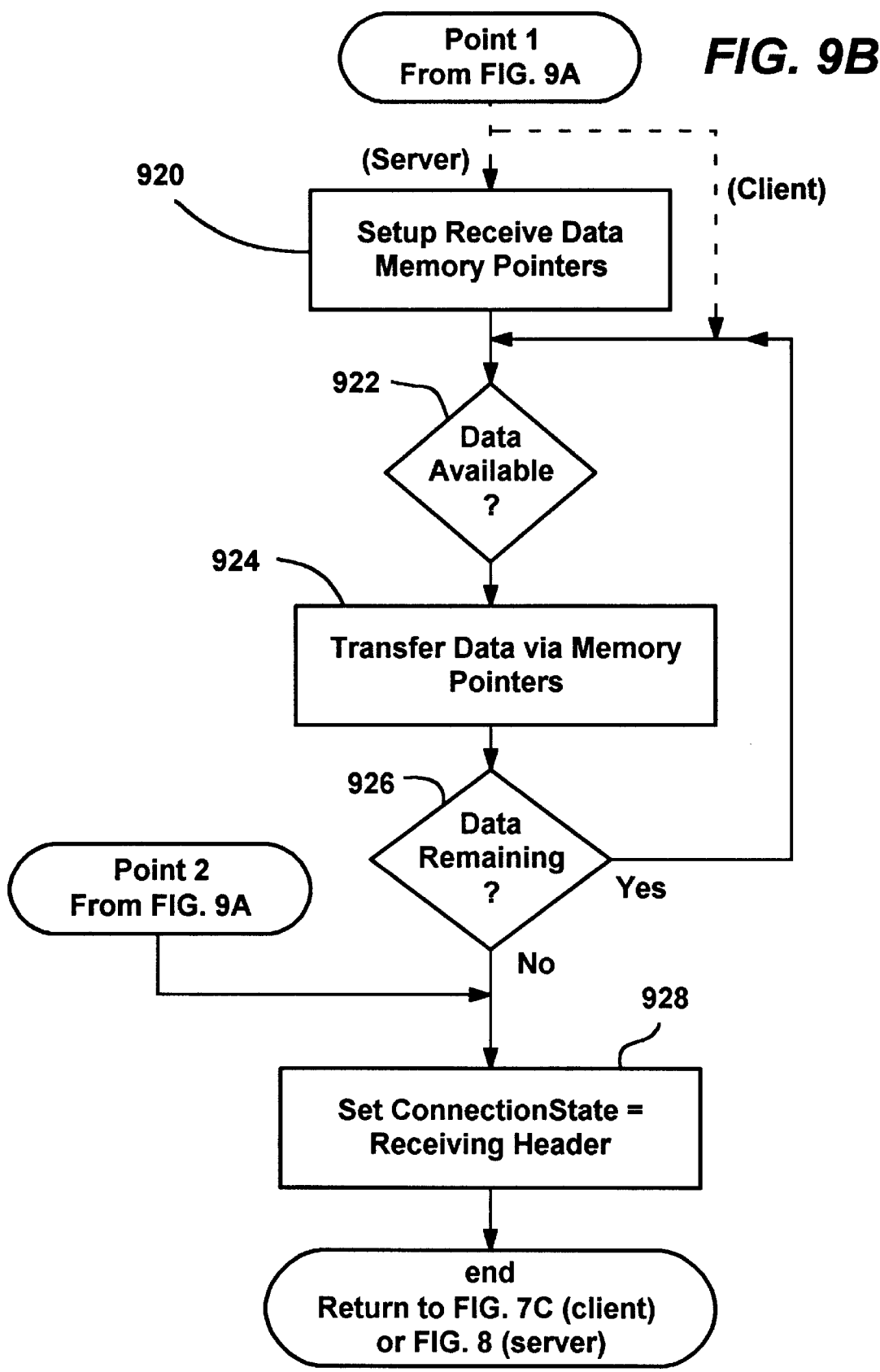

METHOD AND SYSTEM FOR REMOTE ACCESS TO COMPUTER DEVICES VIA CLIENT MANAGED SERVER BUFFERS EXCLUSIVELY ALLOCATED TO THE CLIENT

TECHNICAL FIELD

The invention relates generally to computer systems, and more particularly to a method and system for using computer devices across a computer network or networks.

BACKGROUND OF THE INVENTION

Redundant storage for storing important data is known to provide benefits versus storing such data on a single device. For example, in computer clustering applications, where independent servers are grouped together and managed as a single system for purposes of reliability, redundant storage increases cluster availability since the cluster can continue to access the data if one of the plurality of disks fails. In general, with redundant disk storage, sufficient data is stored on two or more disk drive devices to enable reconstruction of the data in the event of the failure of one disk drive device. Typically the two or more disk drive devices are either co-located or are connected via a single storage bus such as a SCSI (Small Computer System Interface) cable.

However, the use of SCSI technology has a number of drawbacks, a first of which is that SCSI cabling is relatively expensive and hard to configure properly. Perhaps more importantly, SCSI limits the number of devices that can be connected thereto, and also limits the distance that the devices may be separated from one another, since SCSI cable lengths are relatively limited. These are significant problems in disaster recovery applications, where enterprises attempt to redundantly store their data in far-apart locations, e.g., so that a fire in one data center does not disrupt the entire enterprise. As an alternative to SCSI, Fibre channel technology is being used. However, although Fibre channel has increased the length somewhat, it is still relatively limited in length and in the number of devices that can be connected thereto.

Prior redundant storage systems such as remote disk mirroring mechanisms have used device-specific protocols (e.g., a block transfer protocol) to transfer the data to the remote disk drive. However, such protocols are neither flexible nor extensible. For example, if the remote disk drive needs to be changed, the protocol and/or other information may need to be changed on the local machine to handle the new drive. As amounts of data increase, and as disk drives similarly grow in size, such changes are becoming frequent. Moreover, in addition to storage devices, the sharing of other devices such as parallel and serial ports and modems may benefit from remote access. However, no technology is heretofore known to be available that provides access to any type of remote device in a flexible and extensible manner.

SUMMARY OF THE INVENTION

Briefly, the present invention provides a method and system for using the existing structure of an operating system to enable access to and control of many types of remote devices, including disk drives, across a network. A client driver intercepts and queues input/output requests, such as I/O Request Packets (IRPs), that are destined for a target device which an application essentially considers a local device. For example, the target device may include a remote disk device used for purposes of redundant storage. The client driver manages preallocated buffers on the server, and may classify the I/O request to correspond to classes of the buffers. When a buffer is available, the client driver dequeues the I/O request, marshalls it with header information and data, and sends it as a message to the server over one of possibly several connections to the server.

When the message is received at the server, a server driver unmarshalls the message, places its data in one of the preallocated buffers as designated by the client, and generates an I/O request therefrom directed to the server target device. The device performs the requested function and responds with a completion status. The server returns the completion status and data (if any) to the client. The client places the data (if any) in the appropriate location and completes the I/O request with the I/O status of the operation as determined on the server by the target device.

The method and system also may handle cancel operations on the remote device. Further, sequential processing may be ensured, and the client may also load balance across the multiple paths, by selecting a given connection path based on criteria including pending message size and dynamic performance measurements of the connections.

Other advantages will become apparent from the following detailed description when taken in conjunction with the drawings, in which:

BRIEF DESCRIPTION OF THE DRAWINGS

FIG. 3 is a representation of client-side components for accessing and controlling a remote device across a network in accordance with an aspect of the present invention;

FIGS. 8A–8B comprise a flow diagram representing the general steps taken on the server side to handle remote access of a device in accordance with an aspect of the present invention; and FIGS. 9A–9B comprise a flow diagram representing the steps taken by the client or server connection state machine to handle a received communication.

DETAILED DESCRIPTION OF THE INVENTION

Exemplary Operating Environment

Figure 1:
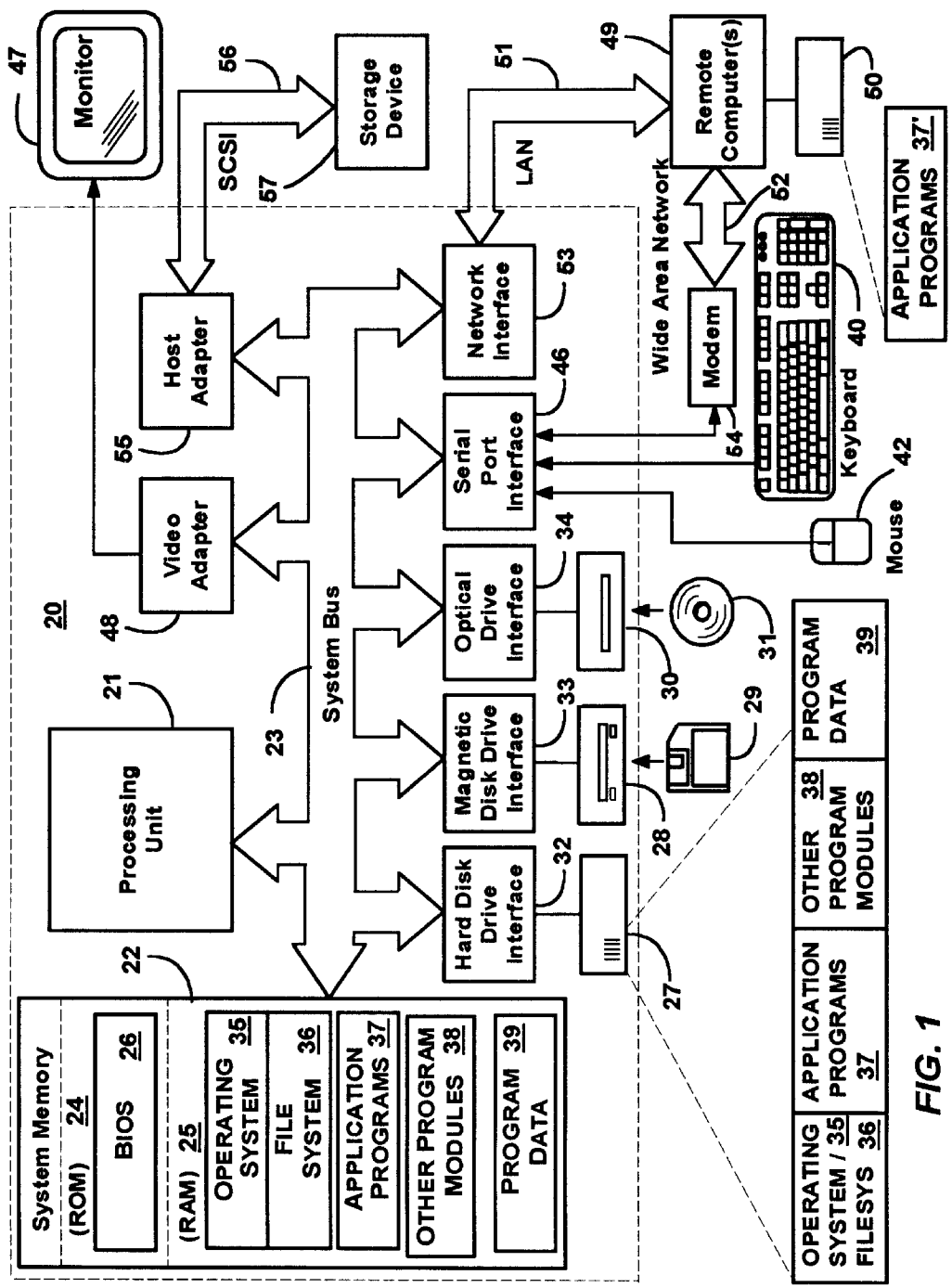
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

DEVICE ACCESS OVER A NETWORK

The present invention has been implemented using Microsoft Corporation's Windows® 2000 (formerly Windows NT®) operating system, in particular utilizing the I/O (input/output) system thereof. For example, and as represented in FIG. 2, the present invention utilizes the Windows® 2000 I/O system architecture that provides I/O Request Packets (IRPs) from an I/O manager 60 in response to filesystem 62 I/O requests from an application program 64 on a local client machine 66. Notwithstanding, there is no intention to limit the present invention to Windows® 2000 or Windows NT®, but on the contrary, the present invention is intended to operate with and provide benefits with any operating system, architecture and/or file system that uses I/O requests for transferring information.

In accordance with one aspect of the present invention, an installable (filter) driver object 68 receives the IRP, possibly after passing through a driver stack 70 of one or more other filter drivers, and essentially transfers the IRP over a network interface 72 and communication path 74 to a server-side network interface 76 and server-side driver object 78 of a remote machine 80. The server-side driver object 78 configures and sends a corresponding IRP to a device driver 82, which then appropriately accesses a device 84 that is remote with respect to the client. Moreover, note that although the present invention is primarily described with reference to a remote storage device, the present invention is not limited to storage devices, but instead, may be used with virtually any type of remote device 84 capable of being accessed through an I/O request. For example, serial and parallel ports, camera devices, scanners, modems and so forth may be controlled by a remote client 66 in accordance with the present invention. Particular benefits may be obtained with generally high cost devices used intermittently, such as tape pools, modem pools and so forth.

Further, although the present invention provides benefits with separate client and server machines remotely located from one another, it is feasible to have the client and the server in the same physical machine. For example, a given machine may be arranged with a plurality of server driver objects such that client driver objects control a plurality of modems attached thereto. When that given machine itself needs a modem, it may instantiate its own client driver object. Thus, as used herein, the term "remote" does not necessarily mean physically remote. Notwithstanding, for purposes of simplicity, the present invention generally will be described with respect to physically separate client and server machines 66, 80.

It should also be noted that that unlike redirectors to network drives, the client 66 may essentially own the remote device 84, i.e., it is not necessarily a shared device. To this end, the server filter object 78 may block any IRPs (e.g., via a server application 86, file system 88, I/O manager 90 and optional driver stack 92) from reaching the device driver 82 other than those originating from the client filter driver 68. Note that sharing may be allowed, for example, under the control of an administrator, and thus the blocking of such IRPs may be optional. As alternatively represented in FIG. 2B, the client filter driver 68 may receive the IRP from a Software RAID (Redundant Array of Inexpensive Disks) object 93, which also sends an appropriate IRP to a local device driver 94 of the client machine 66, to access a counterpart local device 96, e.g., for mirroring, striping, and/or parity.

Figure 4:
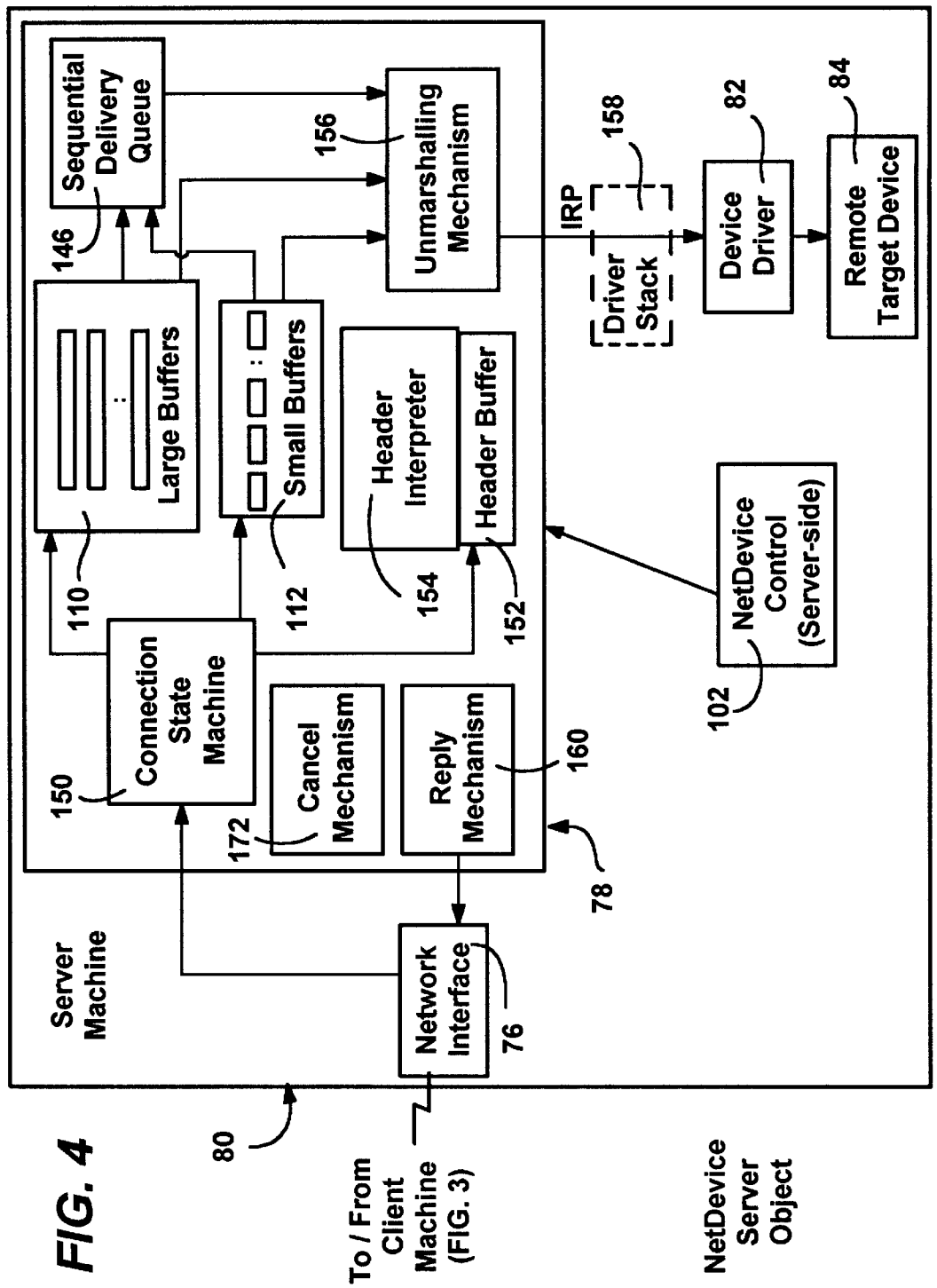
FIG. 4 is a representation of server-side components for handling the accessing of the device across a network in accordance with an aspect of the present invention.

As represented in FIG. 3, the "NetDevice" components of the client-side portion of the present invention include instances of NetDeviceControl 100 and the client-side filter driver object 68, sometimes referred to as NetDeviceClient. As represented in FIG. 4, the NetDevice components of the server-side portion of the present invention include instances of NetDeviceControl 102 and the server-side filter driver object 78, sometimes referred to as NetDeviceServer. The NetDeviceControl drivers 100, 102 set up the connections and buffer allocations, and create, control, and delete the NetDeviceClient and NetDeviceServer device objects 68, 78 on their respective machines. To this end, the NetDeviceControl drivers 100, 102 maintain in each machine's registry a list of devices and/or partitions to attach to at boot time. Subsequent attachments may be performed as a result of IOCTL (I/O control) requests to NetDeviceControl drivers 100, 102, e.g., originating from the application 64. Preferably, the NetDeviceControl drivers 100, 102 will be unloadable, (provided there are no client or server instances), and, if no boot-time attachments are needed, may be started after the system is loaded. It is also feasible to have more than one instance of the NetDeviceControl drivers 100, 102.

Communication between the client and server machines 66 and 80 is presently implemented via the respective network interfaces 72 and 76, which utilize Windows® 2000's transport driver interfaces (TDI) to TCP/IP functions. The TCP/IP protocol (Transmission Control Protocol/ Internet Protocol) is currently used to guarantee ordered, at-most-once delivery of the data and to provide connection failure detection. Note that although TDI is presently used as the interface to networking services, it is possible that System Area Network (SAN) transports will be used with the present invention in the future and they may use alternative interfaces. TDI and TCP/IP are well documented, (see e.g., "Inside Windows NT®," by Helen Custer, Microsoft Press (1993), hereby incorporated by reference), and are not described herein in detail for purposes of simplicity. The physical connection or connections 74, which preferably provide multiple paths, have been successfully prototyped on 10 bT, 100 bT, and/or fiber optic connections.

At present, the client 66 may select from one to eight paths to the server 80, however the upper number is configurable as needed, and may be made negotiable. Multiple paths are preferably used to increase bandwidth and increase fault-tolerance. At the same time, the NetDevice client object 68 maintain statistics 104 (FIG. 3) on the available bandwidth and latency for each path, and via a path selection mechanism 106, may route requests among the paths as desired, such as to perform load-balancing. For example, overall performance is increased by sending small messages on low latency paths, and large messages on high-bandwidth paths. The statistics 104 are regularly updated, and are generally based on the total transport time and the amount of data transmitted. To this end, requests are time-stamped when sent from the client to the server, and when received at the server. The reply sent from the server to the client includes the time difference between the server receive time stamp and the server reply time stamp. The client object 68 (e.g., via the path selection mechanism 106) then calculates the transport time as transport time=(reply received at client−client message sent)−
(server processing delta time difference), whereby the transport time is known and accounts for the server's request processing time.

Figure 2A:
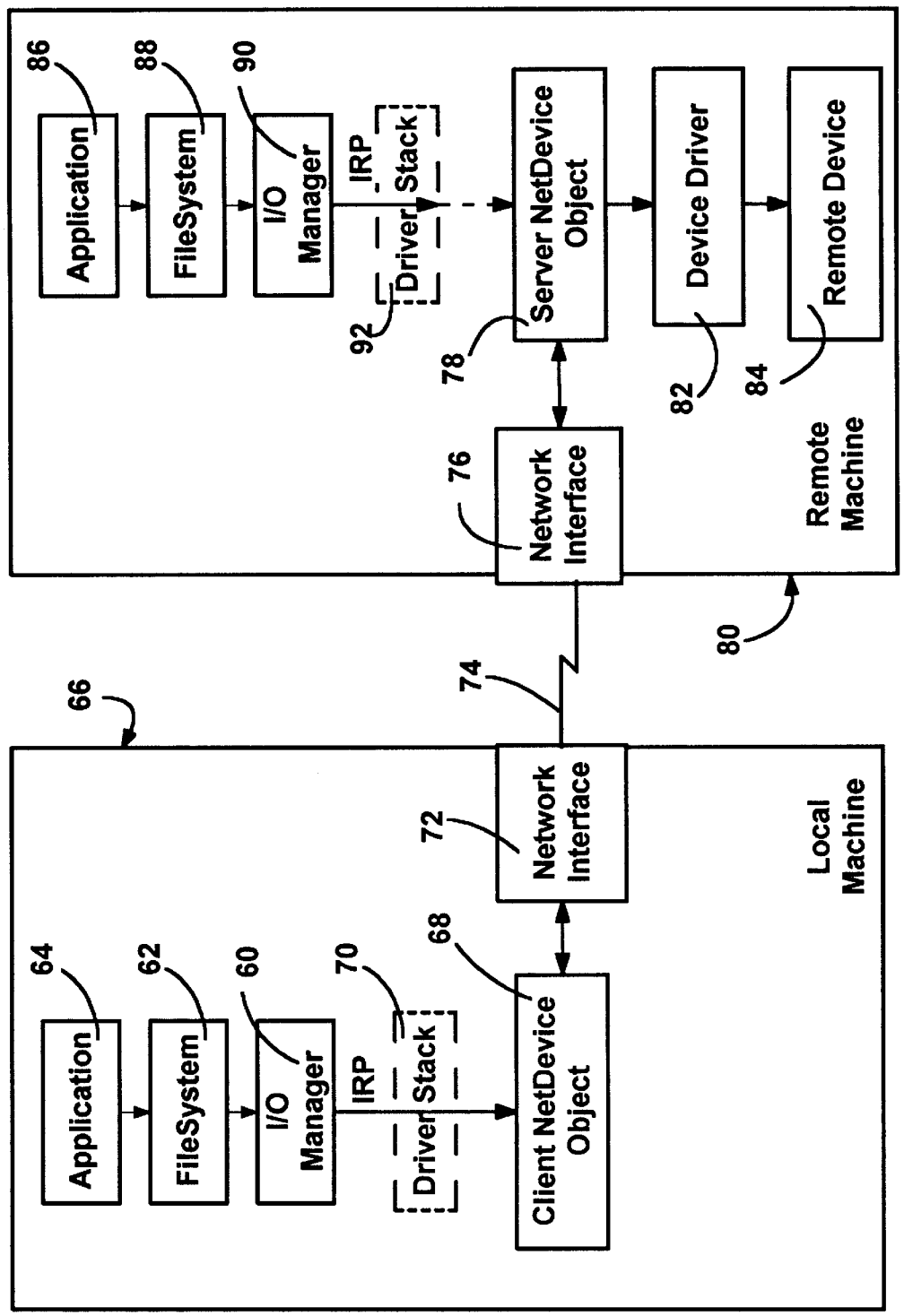
FIG. 2A is a block diagram representing general components in a local and remote machine for accessing a remote device in accordance with an aspect of the present invention.

In the event of a path failure, the NetDevice client object 68 performs retries. More particularly, when the TDI interface 72 notifies the client driver object 68 that a communications path has failed, a connection management mechanism 107 of the client driver object 68 schedules a reconnect attempt and tries to reroute any existing requests that have been assigned to the newly-failed path. If there are no remaining paths, the request is held until each path has attempted one reconnect. If at least one reconnect succeeded, the request is resent, otherwise the request is failed, i.e., an error is returned for the IRP completion code status to the application 64 (FIG. 2A). This technique allows loss-less recovery from a short-term response problem or a transient cable problem. Moreover, each NetDevice request has a retry number 134 (FIG. 6) associated therewith, whereby the server filter driver object 78 properly handles duplicate requests by ignoring stale retries, (i.e., a retry number lower than previously seen), switching paths for replying to active requests, and re-sending replies for previously completed requests. Note that duplicate requests (identified by a bit set in the header) are written to an extra buffer (not shown), so that write/read style requests already in progress that place data into a buffer are not overwritten by the duplicate request.

Figure 2B:
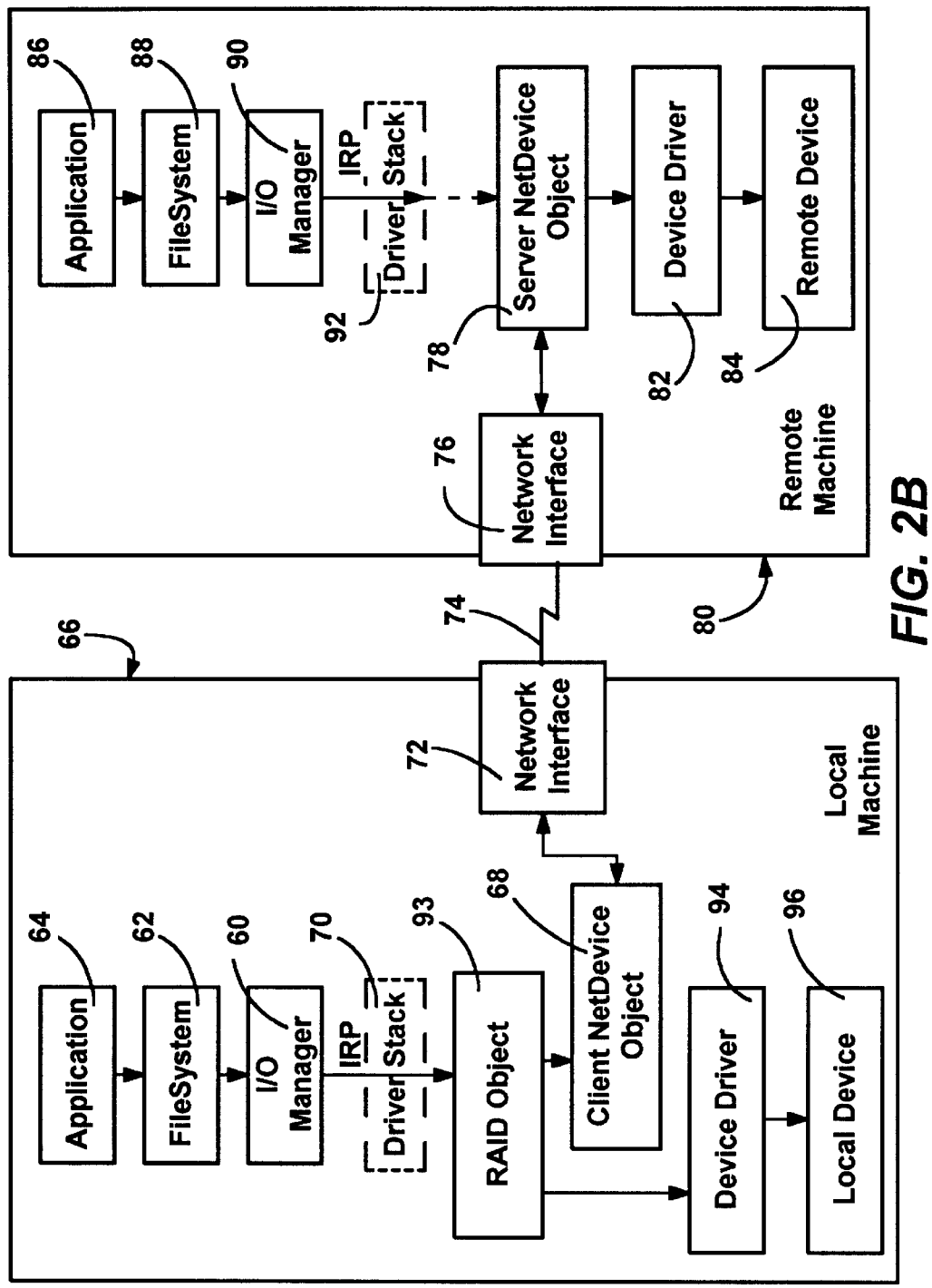
FIG. 2B is a block diagram representing general components in a local and remote machine for accessing both a remote and local device, such as for mirroring, in accordance with an aspect of the present invention.

In accordance with one aspect of the present invention, the NetDeviceClient filter driver object 68 intercepts an IRP sent by the I/O manager 60 (possibly after having passed through a stack of filter drivers 70) and communicates a corresponding request to the NetDeviceServer filter driver 78. When the NetDeviceServer filter driver 78 later returns a status and any data, the NetDeviceClient filter driver 68 returns whatever status was returned, e.g., success or failure and the data (if any). Note that since the client may essentially own the remote (target) device 84, (regardless of whether the application 64 necessarily knows that the target device 84 is remote), the IRP may be intended to be passed the remote device driver 82. Alternatively, as shown in FIG. 2B, the RAID object 93 may split an I/O request as represented by the IRP into more than one request, with zero or more local and zero or more remote destinations. The local requests are handled by passing them to the local device driver (or drivers) 94 and the remote requests are handled by passing them to the client device object 68. The RAID object 93 treats the client device object 68 as if it is a local device. Further, note that in redundant disk operations, it is possible that at least one status will indicate success while at least one other status indicates failure. In such a situation, the client object 68 and RAID object 93 may report the state of the redundant storage elements to some other system component.

Although not necessary to the present invention, for efficiency the client driver object 68 first classifies the IRP via a classification mechanism 108 (FIG. 3). The classification mechanism 108 may classify the IRP based on any desired criteria, however at present, IRPs are essentially sorted into two (or more) classes based on their effective size, i.e., small IRPs (e.g., not more than four kilobytes) and large IRPs (e.g., more than four kilobytes). For example, IRPs requesting a file system operation such as an open, close or delete are relatively small, while IRPs requesting a read or write operation are effectively large since they point to a possibly large amount of data to be read or written. IRPs are well-documented (see e.g., "Inside Windows NT®, Second Edition" by David A. Solomon, Microsoft Press (1998), hereby incorporated by reference), and thus are not described in detail herein.

To facilitate performance, the present invention uses client-side buffer management of sets of server-side buffers 110, 112 (FIG. 4). To this end, at startup time, the server control 102 preallocates the buffers in large and small sets 110, 112 on the server 80, and the client is given control of those sets of buffers 110, 112. The client device object 68 includes code that acts as a buffer tracking mechanism 114 (FIG. 3), to track the state of each buffer in the sets of buffers 110, 112, whereby the client only sends messages to a buffer when it is available. As a result, the buffer is guaranteed to be available when the client message arrives. To this end, the tracking mechanism 114 marks a buffer as unavailable when a request is sent thereto, and available when the server replies to that request in a manner that indicates the buffered request data was processed. Note that if no buffer is available, the client queues the request until one is available, such as in local large and small request queues 116, 118 (FIG. 3). Note that to provide for sharing, each client will be allocated a set of buffers on the server for that client's exclusive use. For example, if there are three clients for a given server, each client will 'own' its own set of buffers on the server.

As described above, multiple message classes are thus supported via the classification mechanism 108 and distinct buffer sets 110, 112, along with the queues 116, 118. Note that if the classification mechanism 108 classifies the IRPs into one or more other categories, additional buffers and queues (not shown) may be made available for queuing and buffering those other categories of IRPs. As one classification distinction, classifying each message by its size allows more efficient use of memory. For example, if incoming IRPs are classified and then sent as requests to (or queued in the queues 116, 118 for) either large or small buffers based on their size, the possibility of a small message tying up a large buffer is avoided. As can be readily appreciated, via this general architecture, other class distinctions, such as high priority versus low priority message classes, may be implemented in a straightforward manner.

The preallocation and client-side management of the server-side buffers has many benefits with respect to performance and connection-failure retries. For example, the server 80 does not need to allocate memory for a message or refuse a message. Moreover, because memory allocation is not performed for each message, the server code need not be run in a thread, but may operate at the interrupt level, Which is very fast and efficient. In addition, client-side buffer management will allow DMA (Direct Memory Access) transfers from the client to the server using SAN transports. More particularly, the client-side management of communications buffering facilitates the use of DMA, providing "zero copy" messaging. SAN memory mapping is also feasible, whereby the server-side device transfers data to and from the SAN adapter without ever touching server memory, further increasing performance, particularly when returning large amounts of data (e.g., from a scanner device or from a large disk drive read operation).

Figure 5:
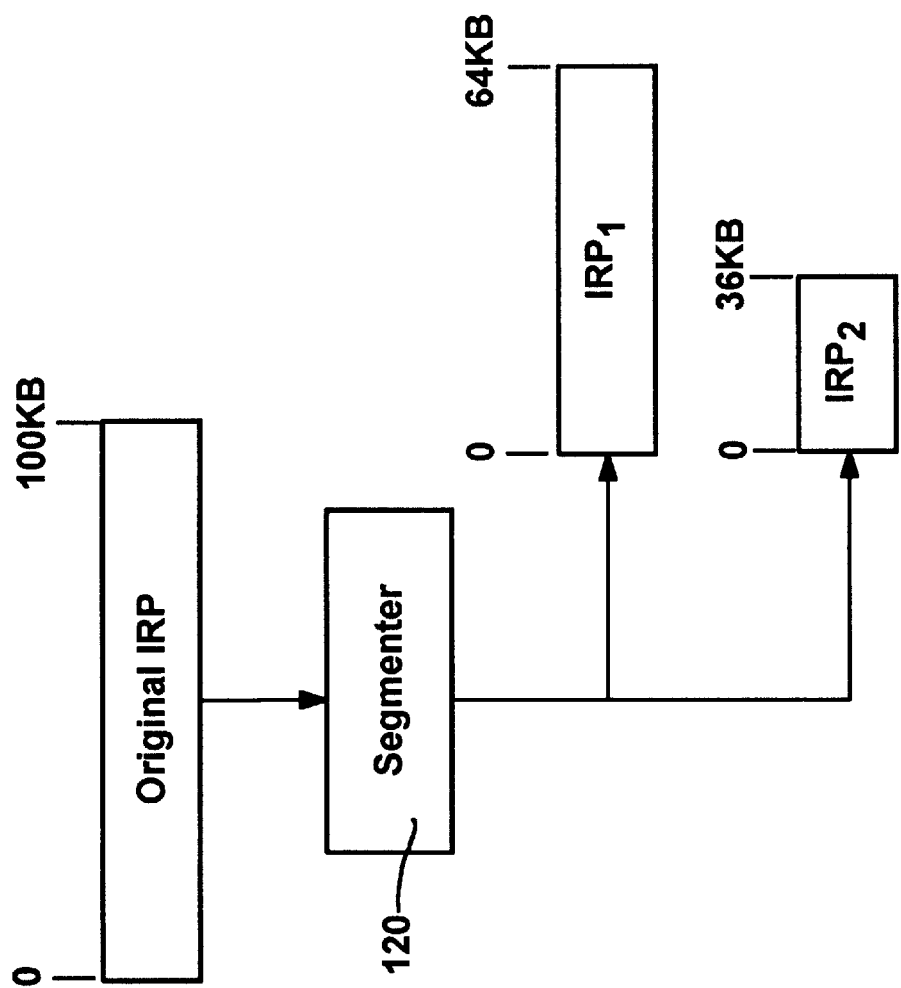
FIG. 5 is a representation of the segmenting of a large I/O request at the client to fit server-side buffers.

Because the server's buffers are preallocated and locked down to increase performance, a large request, such as a request to write a large amount of data to a disk drive, may exceed the largest buffer available on the server. To solve this potential overflow problem, the client-side filter driver 68 includes code comprising a segmenting mechanism 120 (FIG. 3) that segments large requests into smaller requests that fit the buffers, and also a result aggregation mechanism 122 that aggregates the resultant replies from the server 80 to ensure that the original request was fully satisfied. By way of example, as shown in FIG. 5, an IRP is received at the client requesting that approximately 100 kilobytes of data be written, wherein the large buffers 110 are each 64-kilobyte buffers having been preallocated on the server. The segmenting mechanism 120 breaks the request up into two sub-request segments that will fit the buffers of the set 110, e.g., segments $IRP_1$ and $IRP_2$ of 64 kilobytes and 36 kilobytes, respectively (discounting any overhead). As part of the segmenting mechanism 120, the client net device object 68 adjusts the IRP information before transmitting it to the server net device object 78. For example, in the case of disk requests, the memory address, the disk address and the data lengths are adjusted.

However, in order for the segmented request to be considered successful, each segmented sub-request needs a corresponding reply from the server indicative of success. The result aggregation mechanism 122 (FIG. 3) aggregates the replies and only returns a successful IRP completion status if each remote sub-request was successful, since partial writes and the like are not acceptable. For example, if two megabytes of data were segmented so as to be written to a remote disk drive, the result aggregation mechanism 122 completes the original IRP successfully only if each subrequest was completed successfully. In addition, a transfer count is set to the sum of the transfer counts for each subrequest which, by design, needs to be equal to the original transfer count if all subrequest were successful.

Figure 6:
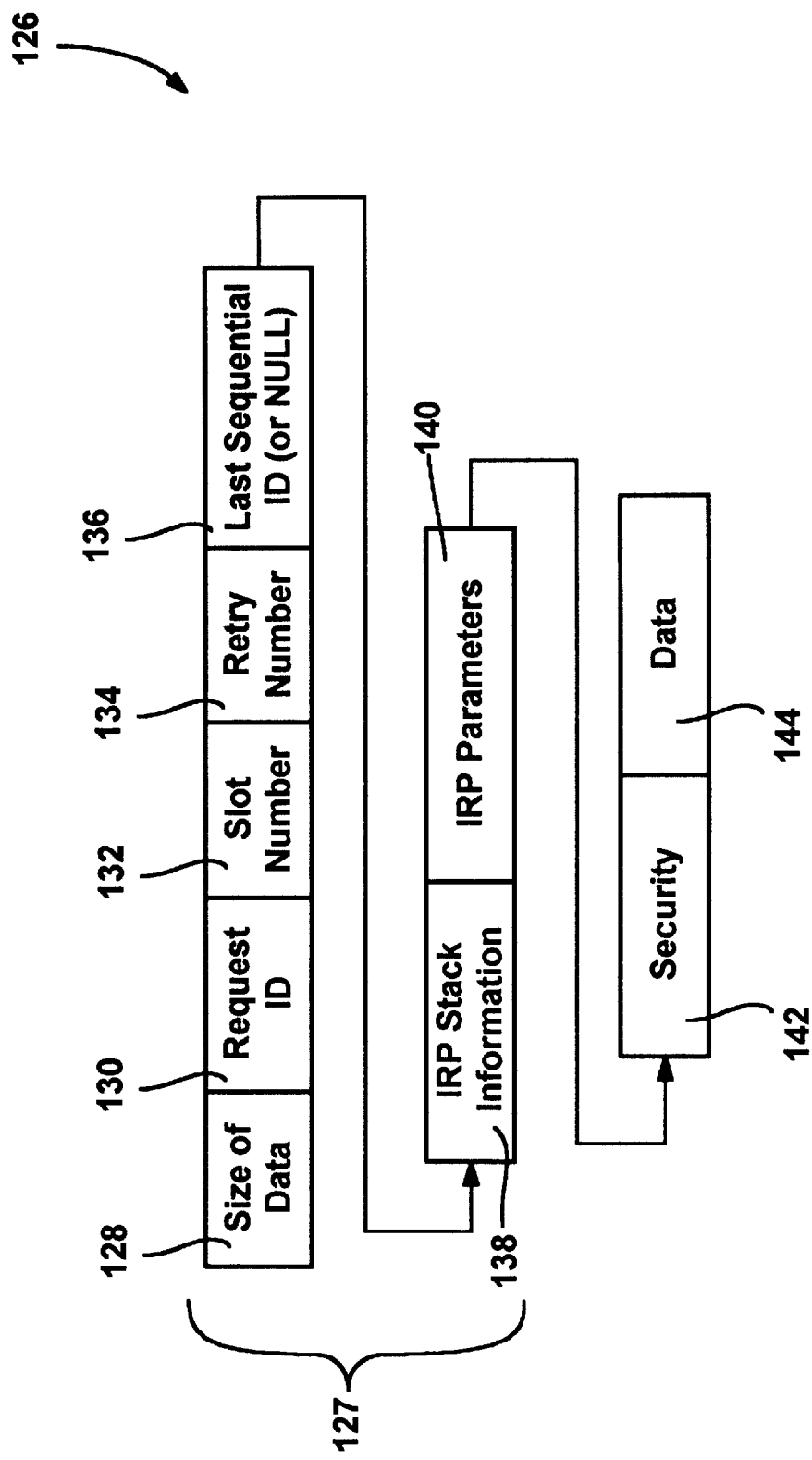
FIG. 6 is a representation of a message marshaled for transmitting the I/O request information to/from the client/server.

When a request, (whether small, large or a sub-request) has a corresponding buffer slot available therefor as determined by the buffer tracking mechanism 114 (FIG. 3), the request is marshalled by client-side code comprising a marshalling mechanism 124 into a marshalled message 126, as generally represented in FIG. 6. To this end, the marshalling mechanism 124 creates a memory descriptor list (MDL) to point to the various pieces of information to send to the server. MDLs are used by TDI, and described in the aforementioned reference entitled "Inside Windows NM®, Second Edition." Such information comprises a header 127 including size information 128, a sixty-four bit request identifier 130, the buffer (slot) number 132 into which the message will be buffered, the retry number 134 and a last sequential identifier 136, which may be NULL. The last sequential identifier 136 is used for sequential processing of requests, as described below. The header 127 also includes the IRP stack information 138 such as IRP counts (read and write counts) type of IRP (major and minor codes indicating whether it is a read request, write request and so forth), pointers, and IRP parameters 140 (e.g., flags). Lastly, following the header 127, optional security information 142 and any data 144 accompanying the IRP (e.g., the write data) are also attached to the message 126 via the MDL. A TDI send then communicates the message to the server. Note that request headers, along with cancel packets, reply headers, and control packets presently share the same length, currently sixty-four bytes, significantly simplifying the connection state machine 150 (FIG. 4, described below).

As can be readily appreciated, via the I/O request, the present invention is completely general with respect to remote devices, although in the Windows® 2000 environment the memory usage of IRPs needs to be known. However, it is not possible to know the memory usage for all I/O requests. In Windows 2000, IOCTL "METHOD_NEITHER" IRPs are essentially private agreements between a device-specific user mode code and a device driver. To support this particular type of I/O request, customized dynamic link libraries (DLLs) that understand the memory usage may be implemented for each such device class.

Some devices may require absolute request ordering, i.e., requests submitted to the NetDevice client 68 must be passed to the server device 78 in exactly the same order as they are received. For example, logs are often checked for their highest numbered entry, whereby an error may result if a log is temporarily written out of order. However, even if the client sent each request (and any segmented sub-requests) in the order received at the client, because of multipath communications latencies and races on the client and server sides, there is no guarantee that the server will receive and process the requests in the order sent. NetDevice offers (for each device) a sequential guarantee for requests.

To optionally provide for sequential requests, the client-side filter driver 68 specifies the request's predecessor request (or NULL for the first of a sequence) in the last sequential ID field 136, and the server-side filter driver 78, via a sequential delivery queue 146 (FIG. 4), submits requests to the device driver in the order specified. Note that this option is available on a per-request basis, and other requests can be mixed in, i.e., some with and some without the sequential requirement. Also, when a segmented request is assigned the sequential option, then its sub-requests also are processed sequentially by the client and the server. As another option, at a higher-level of guarantee, the client will hold off sending the next sequential request by queuing in a client-side sequential delivery queue 148 until the server has replied to the predecessor request.

When the server receives the marshalled message 126 (FIG. 6), i.e., at a network interface 76 card memory or in a buffer therefor, a connection state machine 150 (one per connection) of the server filter object 78 first operates in a header phase (of a connection context) to copy the header portion 127 of the message 126 into a header buffer 152 (FIG. 4). This is because the server filter object 78 first needs to interpret the header 127, via code in the form of a header interpreter 154, so that it can determine the buffer to which the request is assigned. The data is then moved to the assigned buffer, after which the server filter 78 unmarshalls the data via an unmarshalling mechanism 156 to interpret the request, e.g., to build an MDL for the appropriate IRP corresponding to the buffer. When the IRP is ready, the server filter driver object 78 sends the IRP to the device driver 82 (possibly through another stack of filter drivers 158), whereby the remote target device 84 is accessed. Note, however, in the event that the IRP corresponds to a sequential request, the IRP is not sent unless the predecessor IRP (as identified by the last sequential identifier 136, FIG. 6) has been sent to the target device 84. If the sequential identifier 136 does not match the last (sequential) request ID, the IRP is queued in the server-side sequential delivery queue 146. Moreover, it is possible the target device may not process the IRPs in the order sent thereto. If an application needs precise ordering, instead of queuing IRPs at the server side, an option may be selected as described above whereby the client will not send the next sequential IRP to the server until the previous IRP in the sequence is known to have been successfully processed. Although a relatively low-performance solution, ordering is guaranteed.

The server replies via a reply mechanism 160 in essentially the same manner that the client sent the request. Although not shown in detail herein for purposes of simplicity, the client and server essentially reverse roles via counterpart components, whereby the server returns the I/O request (the IRP information and data (if any) obtained from the device) to a connection state machine 162 (FIG. 3) of the client. The client connection state machine 162 fills the header buffer 164 for interpretation by a client-side header interpreter 166. Data (if any) is transferred to the correct data buffer by the connection state machine 162 as directed by the header interpreter 166 and information saved by the marshalling mechanism 164 when the request was sent to the server. Note that on the client, the (per-request) data buffers are owned by the application. Further, note that the MDL list may be more scattered, such as for a data read operation, but nevertheless the appropriate data is returned unless an error occurred.

Even though a reply contains a completed status the IRP may or may not be completed by the client depending on whether all segments of a request have been received. Note that large reads (even though very little data is sent) as well as writes are segmented into multiple requests, whereby each request has exactly one matching reply (unless there are connection failures). If the initial request had been segmented, the statuses/information received counts are aggregated by the result aggregation mechanism 122 to track whether the segmented reply properly completes. Ultimately, the client returns the IRP with an appropriate status code to the system (I/O manager 60), as shown via the IRP completer 168 in FIG. 3.

In accordance with another aspect of the present invention, the cancellation of IRPs (supported by Windows® 2000) is extended across the network. To accomplish cancellation, when the client filter driver 68 is notified (e.g., by the operating system) that a request it owns has been cancelled, client code comprising a cancellation mechanism 170 (FIG. 3) takes action depending on the request state. For requests completely queued in the queues 116, 118 (i.e., a non-segmented request or all the segments of a segmented request) and not yet sent to the server, the IRP is completed with cancelled status and the requests dequeued. If the cancelled IRP was on the sequential queue 148, the sequential queue 148 is adjusted to compensate for the cancelled IRP.

For an IRP already sent to the server, a cancel request is sent to the server 80, for handling by a server-side cancel mechanism 172. The cancel request comprises a message header identifying the cancellation of the message. The I/O request (e.g., IRP) is held on the client-side, however, because the cancel request may not reach the server before the I/O request is processed by the device. If the I/O request is handled at the server before the cancel request is received, the I/O request completes successfully, i.e., the cancel was received too late. Conversely, if the cancel was received in time, then the I/O request is returned with a cancel status.

For canceling segmented sub-requests when some of the sub-requests were already sent to the server, a cancel message is sent from the client for each segment that has been sent to the server. In addition, any unsent segments are also sent to the server when slots become available (with a cancel bit set indicating no accompanying data is being sent). This simplifies cancellation by providing the server with a sequential ID repair mechanism. To this end, the sequential handling is maintained by performing the steps to prepare to send the I/O request (e.g., IRP) to the device driver 82, but before the I/O request is actually sent by the server driver object 78, the cancel is recognized, the I/O request is cancelled and a reply is returned.

Figure 7A:
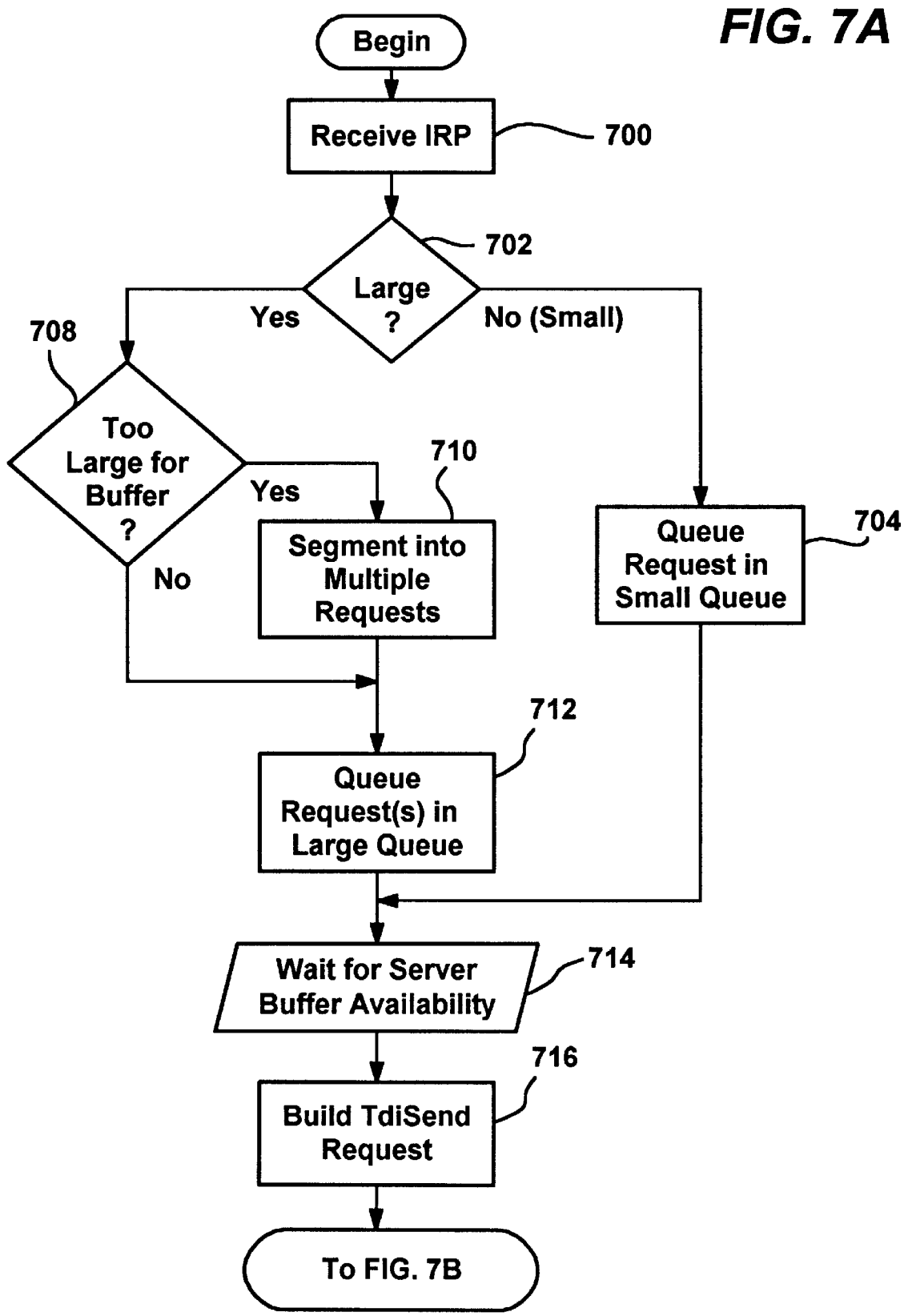
FIGS. 7A–7C comprise a flow diagram representing the general steps taken on the client side to access and control a remote device upon receipt of an I/O request in accordance with an aspect of the present invention.
Figure 7B:
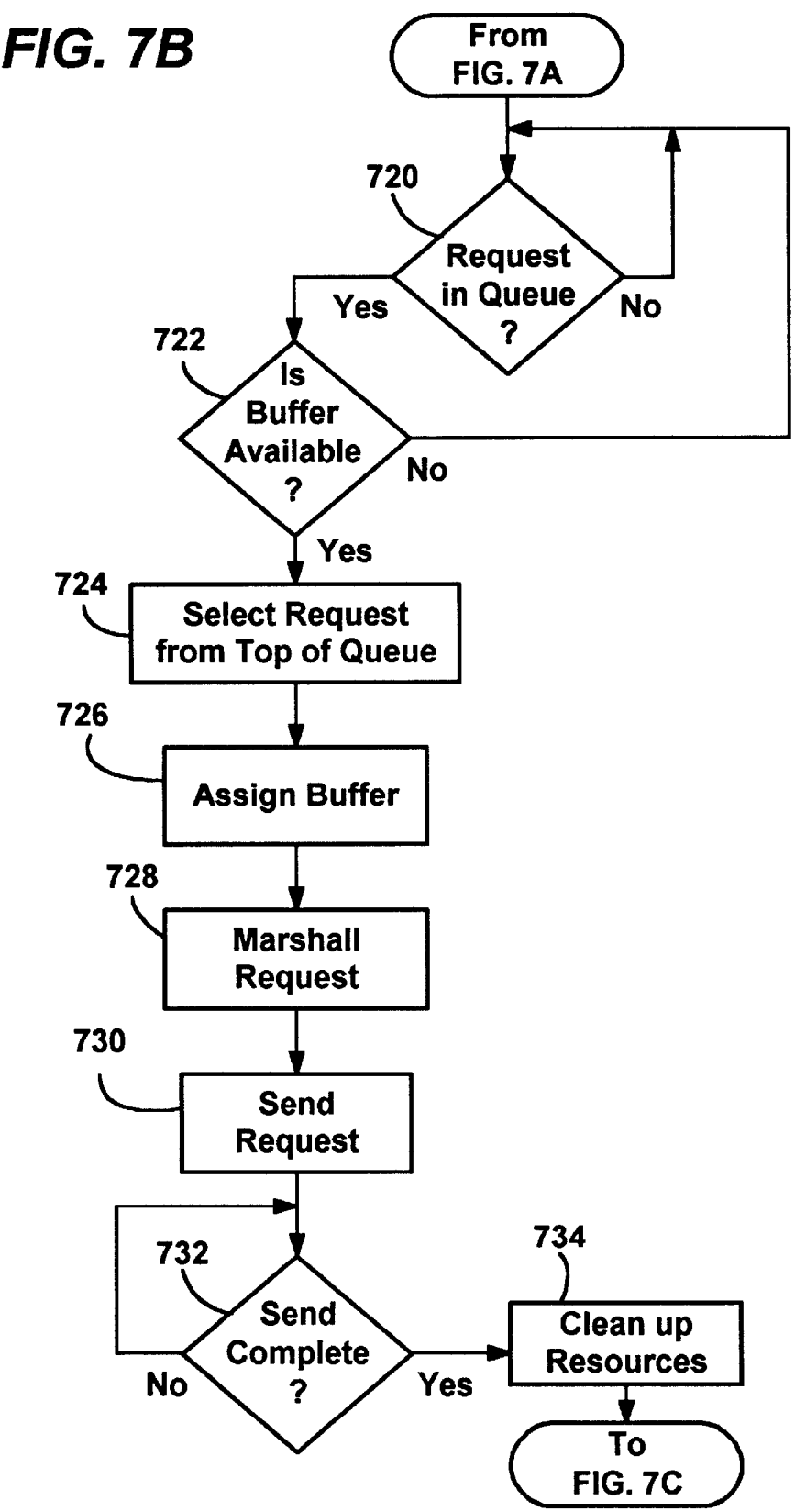
Figure 7C:
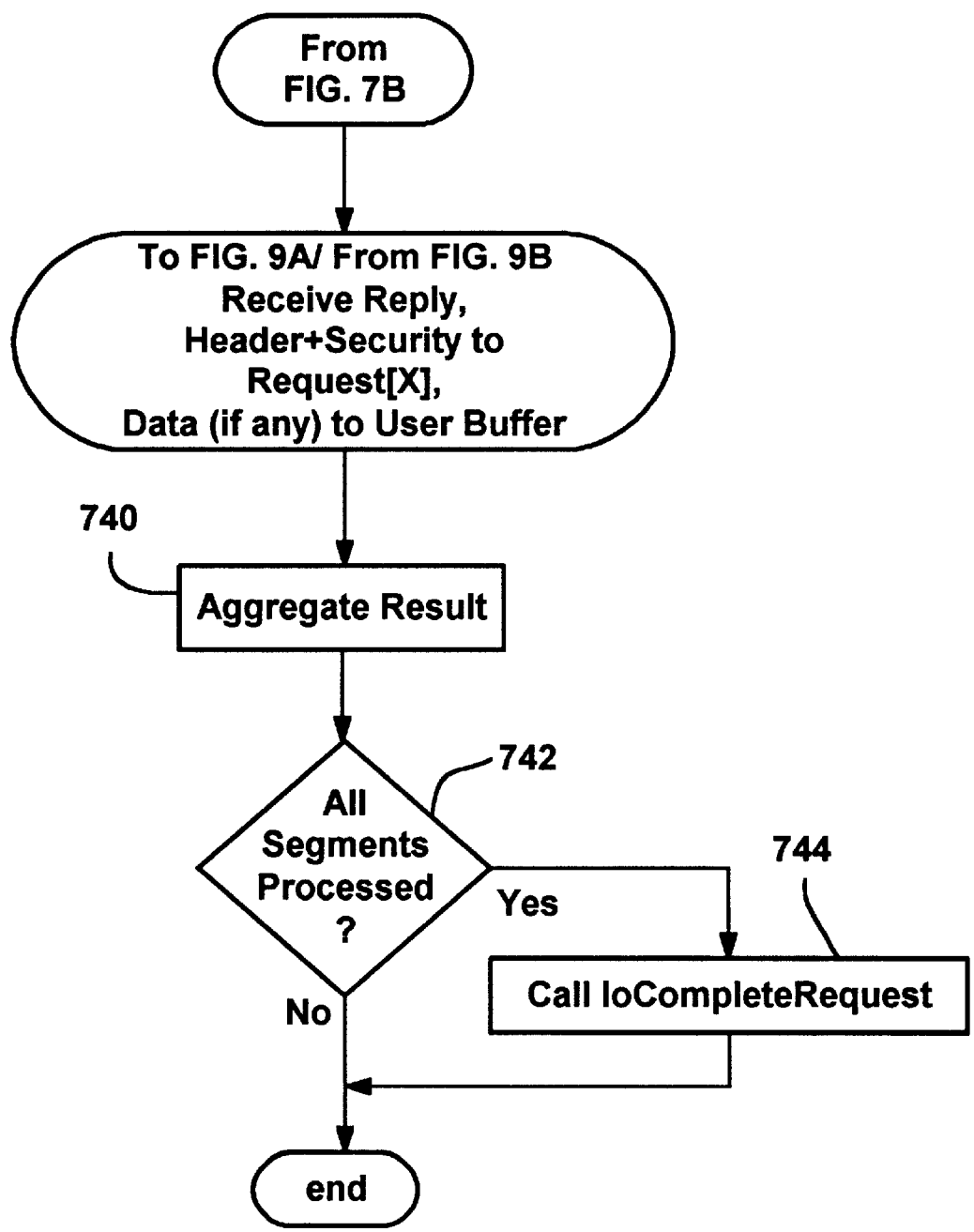

Turning to an explanation of the present invention with particular reference to the flow diagrams of FIGS. 7A–7C, 8A–8B and 9A–9B, there is shown in FIGS. 7A–7C the general steps taken when IRPs are received and handled by the client filter driver 68. FIGS. 7A–7C, 8A–8B and 9A–9B assume that the connections 74 between the client and server have been made, the buffers 110 and 112 have been allocated, the remote device 84 is attached and functioning, and that the TDI network interfaces 72, 76 transports are ready, e.g., the client and server have requested TdiReceiveEvent notifications of their respective network interfaces 72, 76.

As shown in FIG. 7A, when the client driver object 68 receives an IRP (step 700) that needs to be handled, the classification mechanism 108 of the client driver object 68 first classifies the IRP based on its size (and/or other criteria, as appropriate). In the present example, if the IRP is small, the request is queued in the small queue 118. Thereafter, it is attempted to be dequeued by the steps of FIG. 7B, and the client driver object 68 continues to FIG. 7C to handle a reply with respect to this particular request.

If at step 702 the request was determined to be large, step 708 is executed which compares the size of the request against the size of the large buffers. If the request fits into a single buffer, the request is queued at step 712 into the large request queue 116. If the request is too large for the large buffers, the request is segmented at step 710 by the segmentation mechanism 120 into sub-requests as described above, and the sub-requests queued at step 712. Thereafter, dequeuing is attempted by the steps of FIG. 7B, and the client driver object 68 continues to FIG. 7C to handle a reply with respect to the queued request or requests.

FIG. 7B represents the dequeuing process for either large or small requests, the primary differences being which queue is handled, which buffer class is selected for the request and which path is selected (if multiple paths are available). In general, FIG. 7B is event driven and dequeues a request whenever at least one request is in an appropriate queue and a buffer is available therefor. Steps 720 and 722 generally represent the waiting until these conditions are met, (although such steps may be event driven rather than continuously looping until both conditions are met as shown). Under normal, non-overload conditions, a request is dequeued almost immediately after being queued. In any event, when a request is in the queue and a buffer is available, step 724 selects the request from the top of the queue. Note that when segmented sub-requests are being sent, subsequent segments are ordinarily handled before other requests so as to treat the segmented request like a single request as much as possible.

Step 726 assigns the request to a server-side buffer, and step 728 marshals the request into a message for transmission to the server as described above. Step 730 then sends the request (TDI send) to the server. When the send is complete as detected at step 732, the dequeuing process cleans up any resources at step 734 and continues to step 740 of FIG. 7C to await a reply.

Figure 8B:
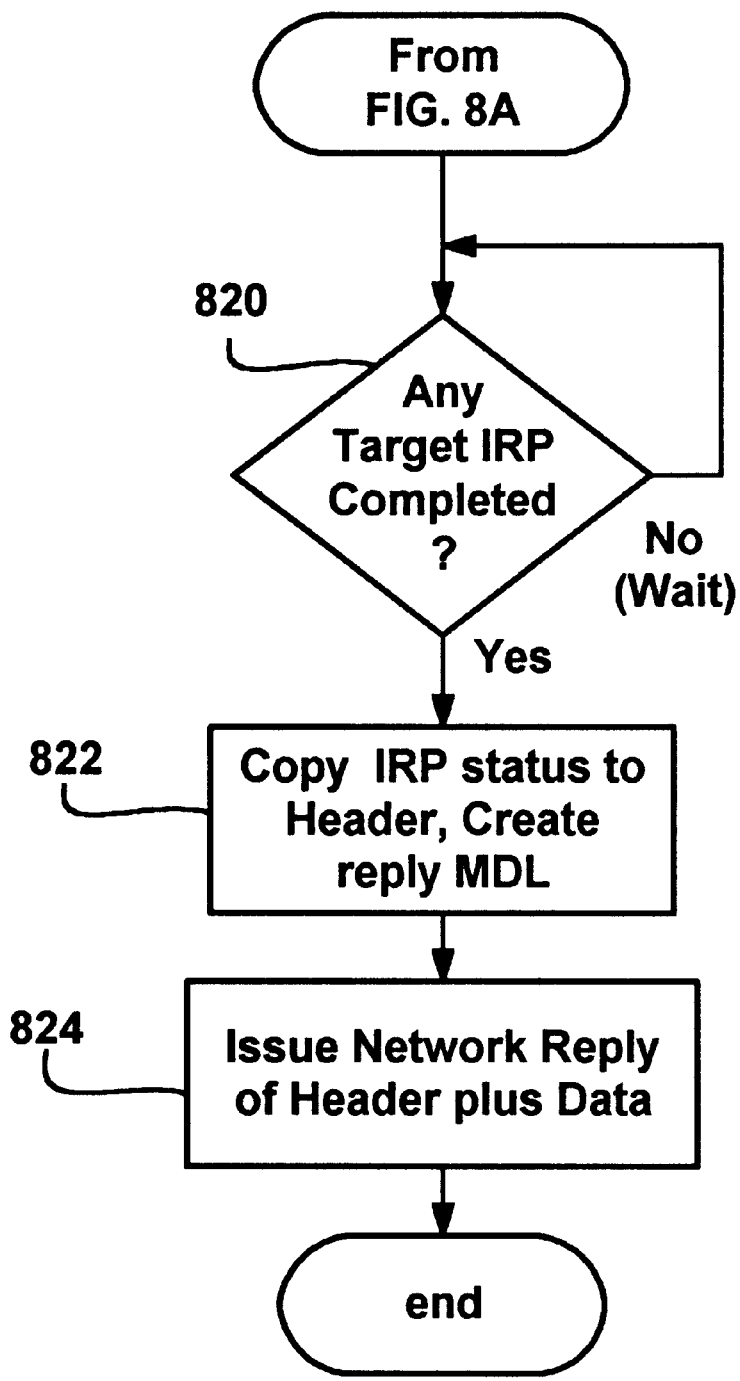
Figure 9A:
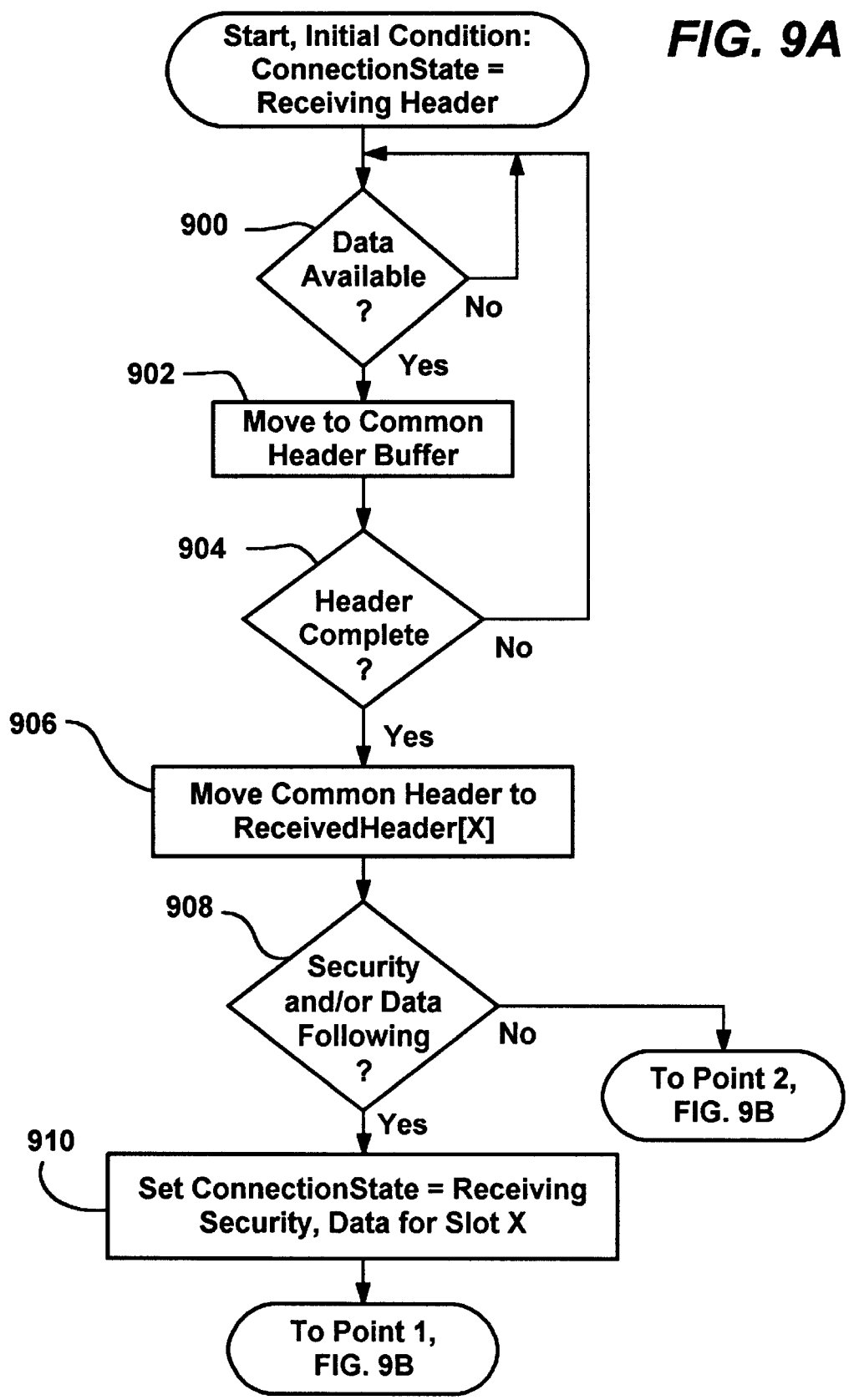

FIGS. 8A–8B generally show the steps taken at the server after the message is received via the connection state machine 150 (FIG. 4). FIGS. 9A–9B represent the steps taken by the connection state machine 150 when a message is received at the server, beginning with the receipt of the header 127 (FIG. 6). Note that FIGS. 9A–9B also represent the steps taken by the connection state machine 162 (FIG. 3) when a reply is received at the client, since the operation is substantially the same (with one difference, as described below) on the client-side. However, for purposes of simplicity, FIGS. 9A–9B will now be described with respect to the server receiving the message from the client. The header 127 is received first, as the message is handled as it comes in to the server. First, at steps 900–904 of FIG. 9A, the initial data received is transferred at step 902 from the network interface card (or a buffer, depending on how received) to the header buffer 152 (FIG. 4). Step 900 represents any idling that occurs until the complete header data 127 is received (the header size is known via some of the initial header bytes received). Once the header 127 is received as determined at step 904, the slot (designated buffer) is known, whereby at step 906, the header buffer 104 is moved to an appropriate location in that slot, designated "[x]" herein. At step 908, the header data 127 is examined to determine if additional security information and/or data accompanies the message, as described above. Note that in the case of a cancel request, for example, no such data may be present, whereby the server filter driver 78 advances to step 928 of FIG. 9B.

When additional data 144 is to be received as determined by step 908, step 910 changes the connection to a state that indicates that the connection is in use and that subsequently received data should be sent to the identified buffer. For messages received at the server, step 920 of FIG. 9B is next executed to set up memory pointers to receive this data. Steps 922–926 represent the transferring of the data 144 to the appropriate buffer. Note that for messages received at the server, this is the buffer (slot [x]) that is designated by the client in the message, while for replies received at the client, this is a data buffer owned by the application. Step 926 loops back to receive the data until no more data remains. Lastly, when the data is received, step 928 resets the connection state to indicate that header data may be received.

At this time the message has been received, whereby step 800 of FIG. 8A configures the IRP's MDL from the message data, or alternatively performs any address fixup operations. If the request is sequential (step 802) and its predecessor has not been sent (step 804) to the device's device driver 82 (FIG. 2B), then at step 806 the request is put in the ordered sequential queue on the server 146 (FIG. 4). At step 808 the NetDevice server sends the I/O Request to the device driver 82/target device 84. At steps 810 and 812, any requests (previously queued in step 806) which are now eligible for transfer to the drive driver 82 are sent thereto, after which step 808 sends the dequeued IRP to the device driver 82/target device 84. Step 820 of FIG. 8B then waits for the IRP to be completed. As described above, step 822 begins assembling the reply, by copying the IRP status to a return header and creating a reply MDL. Note that instead of sequential numbering, the server returns elapsed time information in that field of the header, whereby the client may calculate the transport time as described above. A TDI Send is issued at step 824 which returns the header and any data as listed in the MDL. The server-side process then effectively ends for this message.

Returning to FIG. 7C, the client filter driver object 68 handles the reply, first receiving the reply via its connection state machine 162, also represented by FIGS. 9A–9B. Thus, as generally described above, steps 900–906 await the reply (although the client need not loop awaiting the reply but rather acts on a reply event, i.e. a TDI receive event) and transfer the complete header to the header buffer 164. Step 906 then moves the data from the header buffer to the appropriately designated client-side buffer. Similar to the server-side handling of a message, steps 910 and 922–926 (FIG. 9B) move any data into the designated client-side buffer, although step 920 is not executed on the client side as the pointers were set as part of the original marshalling of the request.

When the reply is thus received, step 740 aggregates the result as necessary (for segmented requests) as described above so that the IRP is or will be configured with its appropriate status. Lastly, when all segments are processed at step 742, the request is completed, the IRP is configured with its appropriate status, and the IRP is sent by the IRP completer 168 back up to the I/O manager 60 via step 744.

As can be seen from the foregoing detailed description, there is provided a method and system that allows a client to remotely access and control devices over a network. The method and system provide access to any type of remote device in a flexible and extensible manner.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system having a client and server, a method for accessing a remote device of the server, comprising:

allocating a plurality of managed buffers at the server for exclusive use by the client and server;

receiving an I/O request at a client mechanism;

communicating a message corresponding to the I/O request to a server mechanism, the client managing the buffers at the server including designating a managed buffer for buffering data in the message, the server buffering at least some of the data in the message in the managed buffer designated by the client; and passing information in the message from the server mechanism to a device driver associated with the remote device.

2. The method of claim 1 further comprising receiving a reply from the server including status information about the request.

3. The method of claim 2 wherein the reply from the server further includes data.

4. The method of claim 2 further comprising providing I/O completion information from the client mechanism in response to the I/O request received thereby.

5. The method of claim 1 wherein the client mechanism is a device object.

6. The method of claim 5 wherein the I/O request comprises an I/O request packet.

7. The method of claim 1 wherein the server mechanism is a device object.

8. The method of claim 1 further comprising writing data to the remote device.

9. The method of claim 1 further comprising reading data from the remote device.

10. The method of claim 1 wherein the remote device is a disk drive.

11. The method of claim 1 wherein communicating a message comprises marshalling the message at the client, sending the message to the server, receiving the message at the server, and unmarshalling the message at the server.

12. The method of claim 1 wherein communicating the message comprises, sending the message to the server and receiving the message at the server, and further comprising, receiving a result at the server from the device driver, converting the result to a reply message including status information, communicating the reply message to the client, receiving the reply message at the client, placing the result in a client-side buffer, and completing the I/O request by returning the status information from the client mechanism.

13. The method of claim 12 wherein the reply message includes data.

14. The method of claim 1 wherein marshalling the message includes adding a header to the request, and further comprising interpreting information in the header at the server.

15. The method of claim 1 further comprising, writing information corresponding to the message to the message into the managed buffer designated by the client.

16. The method of claim 1 further comprising the step of segmenting the I/O request into a plurality of requests corresponding thereto.

17. The method of claim 16 wherein the message corresponds to one of the plurality of requests, and further comprising communicating from the client to the server at least one other message corresponding to at least one other of the plurality of requests.

18. The method of claim 1 further comprising, tracking availability of each managed buffer at the client, and wherein the client designates the managed buffer based on the designated managed buffer being available.

19. The method of claim 1 further comprising receiving another I/O request at the client mechanism, communicating a second message corresponding to the other I/O request to the server mechanism via at least one of the managed buffers, and passing information from the second message from the server mechanism to the device driver.

20. The method of claim 19 further comprising identifying an ordering for passing information from the messages from the server mechanism to the device driver.

21. The method of claim 19 wherein the I/O request and the other I/O request have a sequence associated therewith, and further comprising, waiting at the client for a response from the server indicative of success with respect to the message before communicating the second message to the server mechanism.

22. The method of claim 19 wherein the I/O request and the other I/O request have a sequence associated therewith, and further comprising waiting at the server for the request that is earlier in the sequence to be submitted to the remote device.

23. The method of claim 1 wherein a plurality of communications paths are present between the client and the server, and further comprising selecting one of the paths for communicating the message.

24. The method of claim 23 wherein the performance of the communications paths are measured periodically for latency and bandwidth information.

25. The method of claim 24 wherein selecting one of the paths includes routing the message to one of the plurality of communication paths based on the data size of the request and the latency and bandwidth information.

26. The method of claim 23 further comprising detecting a failure of one of the plurality of paths, and selecting another of the plurality of paths.

27. The method of claim 23 further comprising detecting a failure of each of the plurality of paths, holding at least one message, and attempting to reconnect each path.

28. The method of claim 1 further comprising receiving a cancel request corresponding to a message.

29. The method of claim 28 further comprising transmitting the cancel request to the server.

30. The method of claim 28 wherein the message is queued at the client, and further comprising dequeuing the message in response to the cancel request.

31. The method of claim 28 further comprising segmenting the I/O request into a plurality of requests corresponding thereto, communicating at least one of the requests to the server as a message, and sending a cancel request for each message sent to the server.

32. The method of claim 1 wherein designating one of the managed buffers includes the client selecting a managed buffer based on at least one criterion related to the I/O request.

33. The method of claim 32 wherein selecting the managed buffer based on at least one criterion related to the I/O request comprises classifying the I/O request based on size data.

34. The method of claim 1 wherein the message corresponds to an I/O request for returning data, and wherein the server buffers data returned from the remote device in response to the I/O request in a managed buffer designated by the client.

35. The method of claim 1 wherein the message corresponds to an I/O request for writing data, and wherein write data is buffered by the server for writing to the remote device in a managed buffer designated by the client.

36. The method of claim 1 wherein the server uses a header buffer and a data buffer based on the client designating the managed buffer.

37. In a computer system having a client and server connected by a communication mechanism, a system for accessing a device of the server from the client, comprising, a client-side mechanism for allocating a plurality of managed buffers on the server, the managed buffers managed by the client for exclusive use by the client and server, a client-side driver for receiving an I/O request and preparing the I/O request as a message for communication, the message identifying a designated managed buffer on the server as designated by the client, the client-side driver connected to the communication mechanism for sending the message, a server-side mechanism connected to the communication mechanism for receiving the message, the server-side mechanism interpreting the message to place information therein into the designated managed buffer on the server, and the server-side mechanism passing information in the message to a device driver associated with the device of the server.

38. The system of claim 37 wherein the device driver provides a result to the server-side mechanism, the server-side mechanism converts the result to a reply message including status information and communicates the reply message to the client, the client receives the reply message, and the client places a corresponding result in a client-side buffer and completes the I/O request by returning the status information from the client driver.

39. The system of claim 38 wherein the reply message includes data.

40. The system of claim 37 wherein the I/O request comprises an I/O request packet, the client-side driver comprises a filter driver, and the server-side mechanism comprises a filter driver.

41. The system of claim 37 wherein the remote device is a disk drive.

42. The system of claim 37 wherein the communication mechanism includes a plurality of communications paths.

43. The system of claim 42 further comprising a mechanism for measuring the performance of the communications paths.

44. The system of claim 43 further comprising a selection mechanism for selecting one of the paths based on the performance thereof.

45. The system of claim 44 wherein the selection mechanism selects one of the plurality of paths based on a failure in another of the plurality of paths.

46. The system of claim 37 wherein the client-side driver includes a marshalling mechanism for preparing the message, and the server-side mechanism includes a mechanism for unmarshalling the message.

47. The system of claim 46 wherein the message includes a header, and wherein the designated managed buffer on the server is provided in the header.

48. The system of claim 46 wherein the message includes a retry number corresponding to a number of times the message has been sent.

49. The system of claim 37 wherein the message includes a sequence number, and wherein the server-side mechanism passes information from the messages to the device driver in an order based on the sequence number.

50. The system of claim 37 wherein the client includes a segmenting mechanism for segmenting the I/O request into a plurality of requests corresponding thereto.

51. The system of claim 37 wherein the client includes a tracking mechanism for tracking the availability of each managed buffer at the server.

52. The system of claim 51 wherein the client includes at least one queue for queuing a message for sending to the server when the tracking mechanism indicates a corresponding managed buffer at the server is not available.

53. The system of claim 37 wherein the client includes a client-side cancel mechanism for handling a cancel request corresponding to a message.

54. The system of claim 53 wherein the client transmits a message corresponding to the cancel request to the server, and the server includes a server-side cancel mechanism.

55. The system of claim 54 wherein the client includes a segmenting mechanism for segmenting the I/O request into a plurality of requests corresponding thereto, wherein some of the requests are sent as segmented messages to the server and other of the requests are queued as segmented messages in a queue of the client, and wherein the client-side cancel mechanism handles the cancel request by dequeuing the segmented messages in the queue and by sending a cancel message to the server for each segmented message sent to the server.

56. The system of claim 37 wherein the designated managed buffer is selected based on at least one criterion related to the I/O request.

57. The system of claim 37 wherein the designated managed buffer is selected to correspond to a size of the I/O request.

58. The system of claim 37 wherein the client includes a tracking mechanism for tracking the availability of each managed buffer at the server, and wherein the designated managed buffer is selected by the client based on the availability thereof.

59. The system of claim 37 wherein the message corresponds to an I/O request for returning data, and wherein the server buffers data returned from the remote device in response to the I/O request in a managed buffer designated by the client.

60. The system of claim 37 wherein the message corresponds to an I/O request for writing data, and wherein write data is buffered by the server for writing to the remote device in a managed buffer designated by the client.

61. The system of claim 37 wherein the server uses a header buffer and a data buffer based on the client designating the managed buffer.

62. The system of claim 37 wherein the server server-side mechanism comprises a hardware mechanism.

63. The system of claim 37 wherein the server server-side mechanism comprises a software driver.

64. In a computer system having a client and server, a method for accessing a remote device of the server, comprising, allocating a plurality of managed buffers at the server, the buffers managed by the client for exclusive use by the client and server, receiving an I/O request at a client mechanism, selecting at the client one of the managed buffets on the server, sending a message corresponding to the I/O request to the server, the message associated with information identifying to the server the managed buffer selected by the client for the message, receiving the message at the server, passing information in the message from the server mechanism to the remote device via the selected managed buffer, receiving result information at the server from the remote device, sending a reply message corresponding to the result information to the client, receiving the reply message at the client, and completing the I/O request at the client by returning status information corresponding to the result information from the client mechanism.

65. The method of claim 64 wherein the result information includes status information and data, and further comprising placing at least some of the data in a client-side buffer.

66. The method of claim 64 wherein selecting the managed buffer comprises classifying the I/O request.

67. The method of claim 64 further comprising, at the client, tracking availability of the managed buffers, and wherein selecting the managed buffer comprises selecting the managed buffer based on availability.

68. The method of claim 64 wherein the message corresponds to an I/O request for returning data, and wherein sending the reply message to the client includes sending returned data from a server buffer that corresponds to the managed buffer designated by the client.

69. The method of claim 64 wherein the message corresponds to an I/O request for writing data, and wherein write data is buffered by the server for writing to the remote device in a managed buffer designated by the client.

70. The method of claim 64 wherein the server uses a header buffer and a data buffer based on the client designating tile managed buffer.

71. A computer-readable medium having computer-executable instructions for performing a method, comprising:

allocating a plurality of managed buffers at a server for exclusive use by a client and the server;

receiving an I/O request at a client mechanism;

communicating a message corresponding to the I/O request to a server mechanism, the client managing the buffers at the server including designating a managed buffer for buffering data in the message, the server buffering at least some of the data in the message in the managed buffer designated by the client; and passing information in the message from the server mechanism to a device driver associated with a remote device of the server.

72. A computer-readable medium having computer-executable instructions for performing a method, comprising, allocating a plurality of managed buffers at a server, the buffers managed by a client for exclusive use by the client and server, receiving an I/O request at a client mechanism, selecting at the client one of the managed buffers on the server, sending a message corresponding to the I/O request to the server, the message associated with information identifying to the server the managed buffer selected by the client for the message, receiving the message at the server, passing information in the message from the server mechanism to a remote device of the server via the selected managed buffer, receiving result information at the server from the remote device, sending a reply message corresponding to the result information to the client, receiving the reply message at the client, and completing the I/O request at the client by returning status information corresponding to the result information from the client mechanism.

\* \* \* \* \*